Nov. 29, 1960 L. MICHELS 2,962,709
SELECTIVELY OPERABLE STROBE MARKING CIRCUIT
Filed April 18, 1955 3 Sheets-Sheet 1
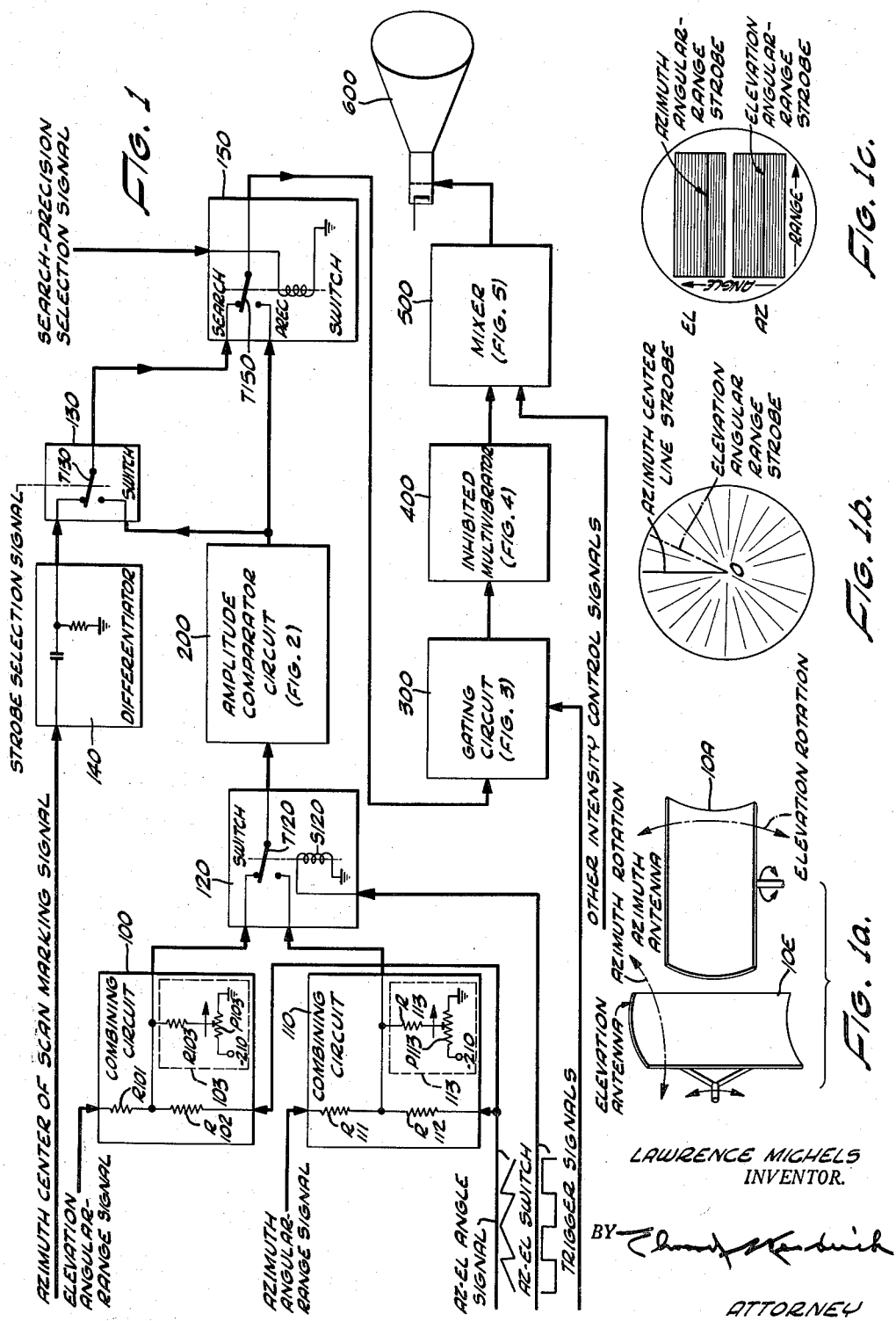
LAWRENCE MICHELS
INVENTOR.
BY
ATTORNEY Nov. 29, 1960   L. MICHELS   2,962,709
SELECTIVELY OPERABLE STROBE MARKING CIRCUIT
Filed April 18, 1955   3 Sheets-Sheet 2
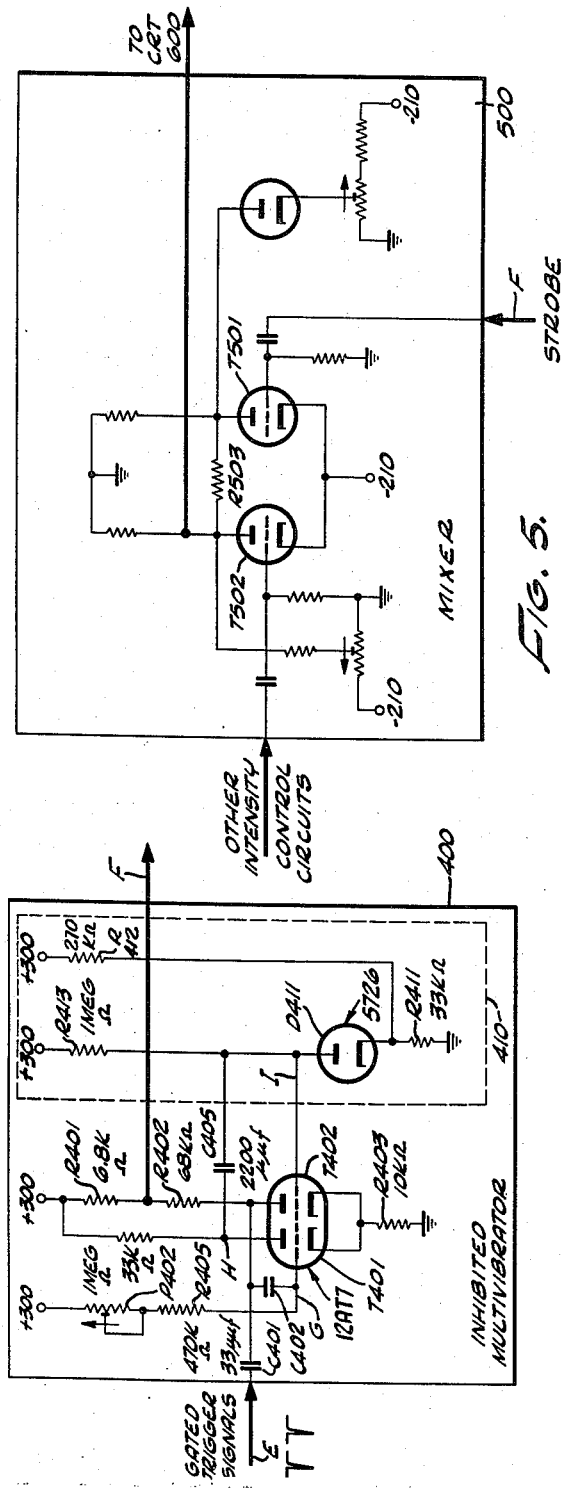
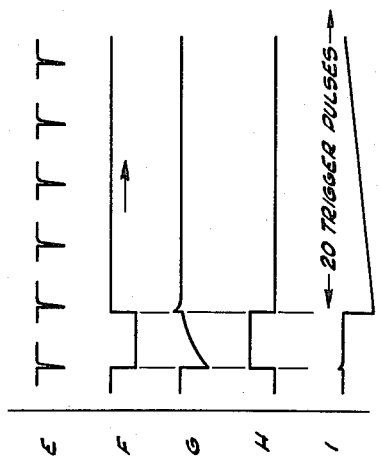
LAWRENCE MICHELS
INVENTOR.
BY
ATTORNEY Nov. 29, 1960 L. MICHELS 2,962,709
SELECTIVELY OPERABLE STROBE MARKING CIRCUIT
Filed April 18, 1955 3 Sheets-Sheet 3
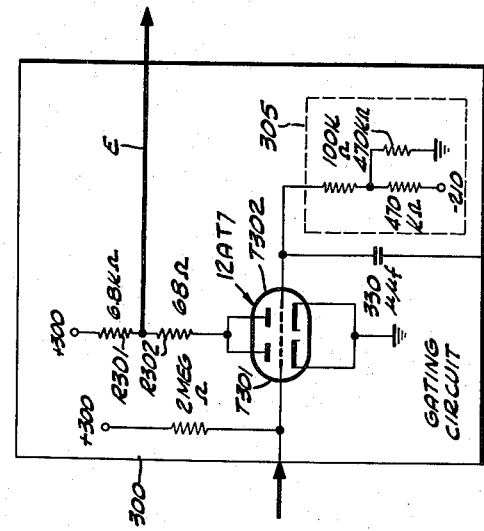
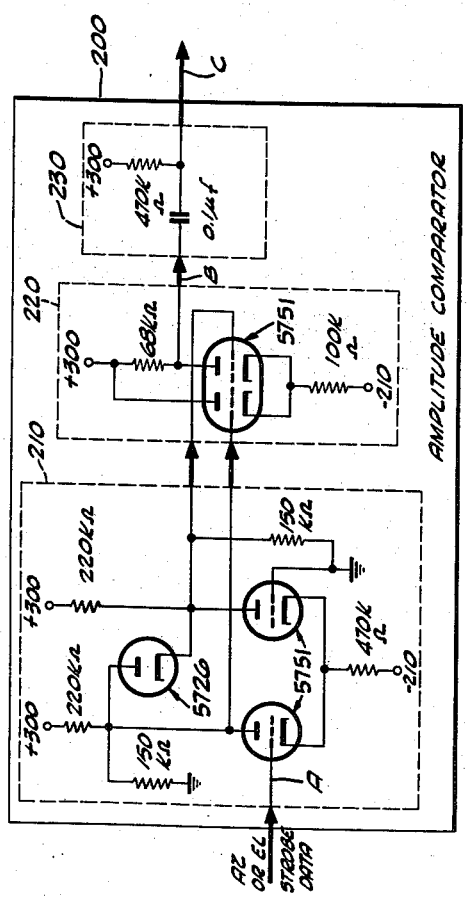
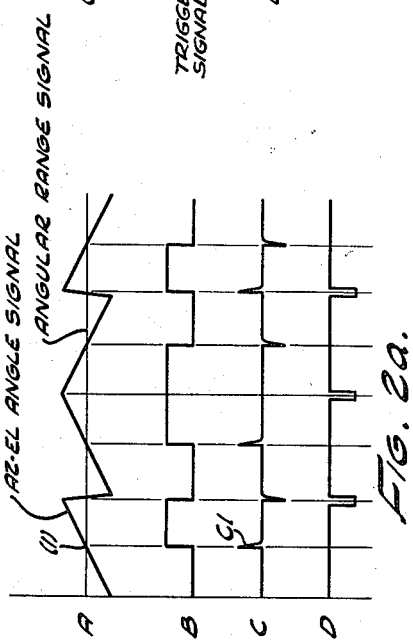
LAWRENCE MICHELS
INVENTOR.
BY
ATTORNEY

United States Patent Office 2,962,709
Patented Nov. 29, 1960

2,962,709
SELECTIVELY OPERABLE STROBE MARKING CIRCUIT

Lawrence Michels, Inglewood, Calif., assignor to Gilfillan Bros. Inc., Los Angeles, Calif., a corporation of California Filed Apr. 18, 1955, Ser. No. 502,047

11 Claims. (Cl. 343—11)

This invention relates to a selectively operable strobe marking circuit and, more particularly, to an improved strobe marking circuit which may be selectively controlled to provide either scan centerline marking signals or angular-range marking signals, the marking signals being appropriate for controlling a search display where a polar or a PPI presentation is utilized, as well as for controlling a precision display in two coordinates.

While the invention may have a multitude of applications, it is particularly useful in a ground-controlled aircraft landing system where the position of the aircraft is specified in two coordinates. In such a two coordinate system one coordinate typically exists in an azimuth plane and is scanned by means of an azimuth antenna. In a similar manner the other coordinate typically is in an elevation plane, perpendicular to the azimuth plane, and this coordinate is scanned by means of an elevation antenna. The radar beams of the respective antennas effectively cover only a limited angular range in the coordinate in which it does not scan. Consequently, the azimuth and elevation positions of the elevation and azimuth antennas must be adjusted in their respective nonscanning coordinate directions to ensure that target echoes are detected in both planes.

Previous arrangements have been devised through which the operator of one antenna has been given information as to the angular range covered by the other antenna. In the earliest arrangements the out-of-plane information was provided by means of mechanical devices of various kinds. This technique introduced the possibility of an error caused by parallax due to the fact that the information of the mechanical devices did not always accurately correspond to the electronic display which was typically derived through the means of a cathode ray tube device.

An important improvement has been previously provided in the system of A. L. Kelsey et al., United States Patent No. 2,483,644 for "Electronic Angle Indication With Particular Reference to Radar Systems," granted October 4, 1949, assigned to the present assignee. In this system the azimuth and elevation angular ranges are respectively represented by V-follower lines corresponding to the scanning angle of the associated antenna. Thus in the azimuth display two lines are present representing the azimuth angular range of the elevation antenna. In a similar manner V-follower lines were present in the elevation display indicating the elevation angular range of the azimuth antenna. The system of Kelsey et al. obviates the errors caused by parallax in the comparison of two positions since all positions are presented through the same electronic means. Consequently no elaborate mechanical linkages need to be set up and held in adjustment.

The system of Kelsey et al. thus provides an important step forward in the field of two coordinate scanning by providing accurate and instantaneous electronic information in respective displays indicating the angular range of the beam in the other coordinate so that precision scanning for aircraft landing may be performed without the loss of the target to be guided.

In the particular circuit arrangement described in the patent by Kelsey et al., azimuth and elevation angular ranges are represented by corresponding voltages derived from associated potentiometers. When V-follower lines are utilized to represent the angular ranges two potentiometers are utilized for each representation. The instantaneous scanning position of the azimuth and elevation antennas then are represented by variable amplitude signals referred to therein as angle coupling voltages and these signals are compared with the associated angle range signals.

This comparison operation is utilized to produce an output pulse marking the amplitude coincidence between the signals which are received. Thus in a particular illustrative situation the potentiometer signals representing the elevation V-follower lines which are to be displayed in the azimuth plane are compared with the variable azimuth angle coupling voltage. The comparator output pulses then are utilized to control the modulation of a range sweep so that the V-follower lines are then intensified on the corresponding display. This general technique of variable angle signals and fixed angular range signal comparison to provide a modulation control signal is also employed in the present invention.

In the particular intensity control arrangement of the Kelsey et al. system the comparator circuit output pulses are utilized to actuate a single stable state mulivibrator which is normally in an unactuated state. When a pulse is received having the proper polarity, the multivibrator is triggered to its unstable state and remains there for a predetermined time corresponding to a period covering at least one sweep length. The multivibrator output signal then controls the operation of a gated oscillator which produces marking pulses during the time that the multivibrator is in its unstable state. The oscillator pulses then are applied to a mixer stage which also receives a sweep intensifying gate signal and produces an intensifying output signal which may be utilized to control the display of a cathode ray tube.

While the Kelsey technique is basic to the present invention and the specific circuit arrangement described therein provides a very satisfactory operation for a two coordinate precision display, the system has certain inherent limitations which become apparent when the particular problems of a mixed search and precision system are considered. These problems will be considered herein with particular reference to the system of copending application Serial No. 511,456, for "Simplified Ground-Controlled Approach System Including Adaptations for Surveillance, Precision Approach, Taxi, and Height Finding," by Landee et al. filed May 27, 1955.

In the system of Landee et al. the same circuit elements are utilized to obtain and display both searching and precision scanning information. The search information is typically displayed in a polar or PPI presentation during which time the azimuth antenna is rotated throughout 360°. The purpose of this operation is to locate aircraft which may require precision landing instruction or control signals in a subsequent operation. It is also important during this phase of the operation to be able to direct the aircraft into the precision scanning area which may be a relatively small angular range such as 30° in azimuth and 7° in elevation.

Consequently, it is important in the system of Landee et al. referred to above that the operator be informed as to the relative position of the azimuth scanning angle and the position of the elevation angular range during the searching operation so that he may properly direct the aircraft into the precision scanning area. It may be noted here that the precision scanning area in each case is associated with a particular runway so that once the aircraft which is being guided has been directed to this area, glidepath and course line signals become available which specify an ideal approach for proper landing.

In addition to requiring marking signals for the searching operation, the system of Landee et al. also requires precision marking signals. Consequently, a selectively operable marking circuit is specified and economic design dictates that this selective operation be achieved with a minimum of additional circuit elements.

Another limitation of the system of Kelsey et al. is that a precise sweep-marking accuracy is lacking. In the Kelsey system it is possible that anywhere from one to two range sweeps may be intensified along various fractional lengths. The reason for this is that the comparison operation which produces the marking pulses is in no way synchronized with the trigger signals which initiate respective sweep intervals. As a result it is necessary to define an increased marking interval, in the order of two sweep periods, during which the marking oscillator is gated on. Consequently, it is possible for sweep intensifying pulses to be effective for two complete sweep intervals or for various fractional intervals commencing after the beginning of a sweep period. This arrangement naturally prevents the precise angular marking of scan center lines or angular ranges.

A further problem arises where two strobe or marking lines must be presented on the same display. This situation is present in the system of Landee et al. above where circuits are provided to allow the selective presentation of either an azimuth center-of-scan indicating signal or an elevation angular-range position indicating signal. These signals may not be presented simultaneously on a search or PPI display since then it would be impossible to determine the separate significance of each. Thus in a typical situation the azimuth center-of-scan signal is presented and the operator's selection is made by depressing a button which then controls a display of the elevation scan angle indicating signal. In this situation then it is possible that the operator's selection signal may occur at a time where the signal change which it causes may indicate the necessity of a strobe marking signal. Consequently, it is necessary to provide circuit means for preventing the ambiguous similarity between a comparator signal specifying the necessity of a strobe marking signal and a strobe selection signal change as is created by the operator's control.

The present invention has extended the basic principles of the Kelsey et al. patent and provides an improved arrangement which may be adapted to provide search strobes as well as the precision display strobes previously available in the Kelsey system. In addition, the invention allows the presentation of a center-of-scan signal through the same circuits which previously may have provided an angular-range indicating signal, the selection between these signals being made in a manner which avoids ambiguity.

In addition, the invention provides an important circuit refinement where the strobe marking signal is accurately controlled in synchronism with the system trigger signals and is exactly one sweep length in duration. Moreover, while the invention provides such an accurate strobe marking signal, it also includes means which ensure that at least one marking signal will occur although only one sweep is thereafter modified. It may be noted at this point that the language "intensity modification" is utilized rather than the term "intensifying" due to the fact that the technique introduced herein is applicable as well to strobe marking by decreasing intensity.

The present invention therefore provides an improved circuit arrangement which is more versatile than that previously available due to its ready adaptation to either the searching or precision display problem, but yet does not require any substantial increase in the circuit elements which are needed. Furthermore, this versatility and circuit economy are achieved in an arrangement allowing an increase in marking accuracy.

In its general system form the present invention comprises the following major components. First and second combining circuits are utilized to produce effective difference signals between an elevation angular-range signal and a variable angle signal, and between an azimuth angular-range signal and the variable angle signal, respectively. These difference signals are then applied through an azimuth-elevation switching arrangement to an amplitude comparator circuit which may be of the preferred type described in copending application Serial No. 462,654 for "Differential Amplifier" by Lawrence Michels, filed October 18, 1954, now abandoned.

In addition to providing strobe marking signals indicating the azimuth and elevation angular ranges the system of the invention is adapted to receive an azimuth center-of-scan signal and to translate this signal into a corresponding strobe mark which may appear on the cathode ray tube. Thus, the system includes a switching arrangement which may pass either the output signal of the comparator circuit, during the time that angular range signals are to be displayed, or may pass the azimuth center-of-scan signal, during the time that a searching operation is being performed. The azimuth center-of-scan signal is first passed through a differentiating circuit before being applied to the switching arrangement so that the selection therein will not produce an ambigious signal which may appear to be a marking signal. This is further explained below.

The output signal derived through the switching arrangement and the comparator output signal are applied to a second switching arrangement which receives a search-precision selection signal. This second switching arrangement then allows the selective operation for either a search display where the center-of-scan signal and angular range signal are displayed or a precision operation where azimuth and elevation angular range signals are translated for respective strobe marking on the corresponding displays.

The signals derived through the second switching arrangement are utilized to actuate a gating circuit which also receives trigger signals which are in phase with trigger signals initiating successive range sweep intervals. The gating circuit then passes at least one trigger signal after receiving a comparator pulse through the search-precision actuated switch. The gated trigger signal is then utilized to control an inhibited multivibrator which responds to the first gated trigger signal and produces a strobe-intensity control signal having a duration of approximately one sweep interval. The inhibited multivibrator is thereafter insensitive to subsequent trigger signals which may pass through the gating circuit. In this manner assurance is made that at least one trigger signal passes through the gating circuit in close time proximity to the comparator pulse which is applied thereto, and the first of the gated signals is then translated into a strobe intensity control signal.

The strobe intensity control signal is then combined, in a mixer circuit, with other sweep intensity control signals which may be considered to constitute the sweep intensifying gate of the Kelsey system. The mixer circuit produces a control signal for modifying the intensity of a cathode ray tube beam in accordance with the marking pattern desired.

Since the invention considered as a system is selectively operable to provide either search or precision strobe lines, and may also be utilized to provide either an angular-range indicating mark or scan center-line indicating mark, it is apparent that a considerable number of subcombinational circuits are provided which may have independent utility. Consequently, while it is convenient to describe the invention in its system aspect where the various features of its versatility become apparent, it will be readily understood that the invention is not so limited and may exist in various subcombinational aspects separately.

Thus, in one subcombination aspect of the invention a strobe marking circuit is provided for producing a signal which may be displayed during the rotational operation of the scanning device to indicate position of a predetermined center line for the scanning device during a precision operation. In another subcombinational aspect the invention provides a circuit for producing a marking signal indicating the time that a first scanning device, which may be an azimuth antenna, passes through the angular range in the same plane of a second scanning device, which may be an elevation antenna.

These first two subcombinational arrangements may, of course, be combined in a selectively operable circuit which, for example, may provide either an azimuth center-of-scan indicating signal or an elevation angular-range indicating signal. Furthermore, the invention may appear in various subcombinational forms where precision strobe marking is to be performed in an improved manner. In these arrangements as in the search strobe marking arrangements, the particular features of the gating circuit and inhibited multivibrator combination provided by the invention are particularly important in ensuring an accurate strobe indication.

Another important subcombinational aspect of the invention is the provision of means allowing the accurate presentation of either a search strobe or a precision strobe, of any type, with the same circuit elements.

Accordingly, it is an object of the present invention to provide an improved angular range marking circuit which may be selectively operable for either search or precision operation.

Another object of the invention is to provide an accurate strobe marking circuit where a particular sweep length period corresponding to a strobe interval may be accurately selected and the beam intensity may be modified during this period.

A further object is to provide a selectively operable marking circuit which may be controlled to produce either an angular range indicating signal or a center-of-scan indicating signal, in a manner avoiding an ambiguity which may otherwise result from the selection operation.

Still another object is to provide an efficient circuit arrangement which may be selectively operated to produe angular-range marking signals or center-of-scan marking signals, the arrangement requiring a minimum of additional circuit elements over those required for producing angular-range marking signals alone.

Yet a further object of the invention is to provide a versatile and efficient circuit arrangement which is selectively operable to provide search or precision strobe marking signals at an operator's option.

A specific object of the invention is to provide a selectively operable strobe marking circuit which may be utilized to provide an azimuth center-of-scan indicating strobe or an elevation angular-range indicating strobe, both of which may be presented on a PPI or polar display.

Another specific object of the invention is to provide a precise strobe marking circuit which may be utilized to produce azimuth and elevation angular range indicating signals, where a single sweep is modified in intensity during a corresponding sweep period.

The novel features which are believed to be characteristic of the invention, both as to its organization and methor of operation, together with further objects and advantages thereof, will be better understood from the following description considered in connection with the accompanying drawings. It is to be expressly understood, however, that the drawings are for the purpose of illustration and description only, and are not intended as a definition of the limits of the invention.

Fig. 1 is a mixed schematic and block diagram arrangement illustrating a typical system employing the features of the present invention;

Fig. 1a illustrates a typical spacial arrangement of elevation and azimuth antennas adapted for scanning in respective perpendicular planes;

Fig. 1b is a graph illustrating the appearance of an azimuth center-line strobe and elevation angular-range strobe in a PPI display which may constitute the search display;

Fig. 1c is a graph of a typical precision display in azimuth and elevation indicating the appearance of the azimuth and elevation angular-range strobes;

Fig. 2 is a schematic diagram of a suitable arrangement of comparator circuit 200 shown in Fig. 1;

Fig. 2a is a composite waveform diagram of various signals appearing in circuit 200 during a typical operation;

Fig. 3 is a schematic diagram of a suitable circuit arrangement for gating circuit 300 of Fig. 1;

Fig. 3a is a composite waveform diagram indicating the appearance of various signals which occur in circuit 300 during a typical operation;

Fig. 4 is a schematic diagram of a suitable circuit arrangement for multivibrator 400 shown in Fig. 1;

Fig. 4a is a composite waveform diagram of various signals which appear in circuit 400 during a typical operation; and Fig. 5 is a schematic diagram of a suitable form of mixer circuit 500 shown in Fig. 1.

Reference is now made to Fig. 1 wherein the general system arrangement of the invention is shown. As indicated in Fig. 1, elevation and azimuth angular range signals are applied to circuits 100 and 110, respectively, which also receive an AZ-EL angle signal which is a composite of the azimuth and elevation angle coupling voltages of the Kelsey et al. system. The manner in which the angular-range signals may be provided is fully explained in the Kelsey et al. system, and the manner of providing the AZ-EL angle signal, as well as an AZ-EL switching signal, which is required herein, is fully described in Patent 2,663,868 to R. B. Tasker for "Sweep Limiter in Radar Indicating System," granted December 22, 1953, and Patent 2,649,581 to H. G. Tasker et al., for "Single Scope Two Coordinate Radar System," granted August 18, 1953, both assigned to the present assignee.

Combining circuits 100 and 110 produce output signals corresponding to the difference between the applied input signals, and these output signals are routed through a switch 120, controlled in accordance with a received AZ-EL switch signal, to an amplitude comparator circuit 200, which effectively compares this difference signal to zero. A specific circuit arrangement for circuits 100, 110 and 120 is shown in Fig. 1 and will be further described below. For present purposes it is considered sufficient to understand the general purpose of the particular components.

Comparator circuit 200 then produces output pulses during respective azimuth and elevation scanning periods indicating the times that the AZ-EL angle signal amplitude passes through a level equal to the level of either the azimuth or elevation angular-range signal.

Amplitude comparator circuit 200 thus may be considered as having the function of translating the angular-range signals into corresponding pulses occurring during respective azimuth or elevation scanning periods where the time-position of each pulse corresponds to the angle represented by the applied signal. In a similar manner the azimuth center-of-scan marking signal is translated into a pulse through a differentiator 140 which is then applied to one input terminal of a selection switch 130, the other input terminal of which receives the output signals produced by comparator 200. The differentiated signal derived through circuit 140 appears similar to the signals produced by comparator 200 and is a pulse having a time position corresponding to the angular position of the center line of the azimuth precision scanning angle. The significance of the various lines will be better understood if reference is made to the above-mentioned copending application by Landee et al., where the antenna scanning motions for surveillance search and precision approach are considered.

The output pulses produced by comparator 200, and derived through switch 130, are applied to a search-precision selection switch 150 and thence to a gating circuit 300 which also receives the system trigger signals. Gating circuit 300 is operative to pass at least one system trigger signal through gating circuit 300, whenever a signal is received through switch 150 having a predetermined polarity change. It is essential that circuit 300 be designed for this polarity discriminative type of operation in order to prevent spurious marking, during the P.P.I. or polar display operation (shown in Fig. 1b), where it is possible otherwise to show a strobe 180° out of phase with the desired strobe. The possibility of this occurrence will be more fully understood when a specific circuit arrangement of the invention is considered below.

The output signals produced by gating circuit 300 then are gated trigger signals and are applied to an inhibited multivibrator 400.

Multivibrator 400 has only one stable state during which time an output signal is available which may be utilized to control the intensity for a normal display. This circuit is "triggered" in response to the first gated trigger signal and then assumes an unstable state during which time an output signal is available which may be utilized to control the display of a modified intensity which may, for example, be utilized to display a brightened strobe line. Multivibrator 400 is designed to return to its stable state after a period which is approximately equal to the duration between trigger signals but yet includes an inhibiting characteristic which renders it insensitive to subsequent input signals for a relatively long period thereafter, which may be in the order of 20 trigger signal intervals. These characteristics are more fully described below with reference to Fig. 4.

Summarizing, then, it will be noted that at least one trigger signal is gated through circuit 300 each time one of the input signals specifies that a stobe is to be presented at the particular angular position represented by the AZ–EL angle signal. The trigger signal gated in this manner then is effective to actuate multivibrator 400 which, in turn, produces an output signal suitable for modifying the intensity of the display device for one range sweep interval. Furthermore, the operation of multivibrator 400 is inhibited thereafter for a period of a relatively large number of sweep intervals to ensure that no false signals may be translated into strobe marking signals at that time.

The output signals produced by multivibrator 400 then are applied to a mixer 500 which also receives other intensity control signals. Mixer 500 is designed to control a display device 600, which may be a cathode ray tube, in a manner which allows the other intensity control signals to determine the normal display characteristic, and the unstable state signal received from circuit 400 to determine the modified display characteristic. The other intensity signals may include blanking signals such as range and angle gating signals so that no modified display will result unless both the unstable state signal (also referred to herein as a strobe signal) and the other intensity control signals are present.

The operation of the embodiment of Fig. 1 may be better understood by considering a specific application. For this purpose, then, it will be assumed that the invention is to be employed in a radar system where azimuth and elevation antennas are utilized which are actuated to scan in respective perpendicular planes. A typical configuration of such antennas is shown in Fig. 1a, and it may be assumed for the present purposes that elevation antenna 10E shown therein is coupled to a variable center tap potentiometer providing a varying voltage corresponding to the angular position of the elevation antenna in azimuth. This voltage then constitutes the elevation angular-range signal which is applied to combining circuit 100. In a similar manner, the azimuth antenna 10A shown in Fig. 1a may be coupled to a voltage-providing potentiometer which produces an output signal having an amplitude representing the angular position of the azimuth antenna in elevation. The motions of the elevation and azimuth antennas in azimuth and elevation, respectively, are indicated in Fig. 1a by means of dotted line arrows.

The elevation and azimuth-angular range signals are combined with the AZ–EL angle signal in circuits 100 and 110, respectively. In a simple arrangement, circuit 100 may consist of a resistance adder circuit including first and second resistors R101 and R102, respectively receiving the elevation angular-range signal and the AZ–EL angle signal. The junction of resistors R101 and R102 is connected to a phase-adjust circuit 103 which introduces a signal level allowing a variation in the phase position of the pulses produced by comparator circuit 200, as will be more fully understood after the operation of circuit 200 is considered with reference to waveforms shown in Fig. 2a.

Phase adjust circuit 103 may simply comprise a potentiometer P103 providing a variable voltage at its output variable center tap which is then applied through a resistor R103 to the junction of resistors R101 and R102.

In a similar manner combining circuit 110 may comprise resistors R111, R112 and R113 corresponding respectively to resistors R101, R102 and R103 in combining circuit 100; and may include a potentiometer P113 corresponding to potentiometer P103 of circuit 100.

The elevation and azimuth angular-range signals are selected to be negative signals having amplitudes indicating the respective angular position of the antenna. When these signals are combined with the AZ–EL signal, the resulting signal is a difference signal which becomes zero when the corresponding input signal is equal to the amplitude of the AZ–EL angle signal.

These effective difference signals then are applied to switch 120 which is indicated to include a transfer element T120 actuated by a solenoid device S120 in response to an applied AZ–EL switch signal. The AZ–EL switch signal has a low or normal state during each azimuth scanning period so that the transfer contact T120 is in its unactuated state, as shown, during azimuth scanning periods. The AZ–EL switch signal has a high state, on the other hand, during elevation scanning periods resulting in the actuation of solenoid S120 and transfer of element T120. Thus, during azimuth scanning transfer element 120 is in its upper position and receives a difference signal representing the amplitude difference between the elevation angular-range signal and the then-present azimuth portion of the AZ–EL angle signal.

In this manner, then, an azimuth signal crossover occurs whenever the amplitude of the azimuth portion of the AZ–EL angle signal is equal to the elevation angular range-signal, resulting in a change of sign in the output signal derived through transfer element T120. This signal change is applied to comparator circuit 200 and results in a sharp comparator output pulse, as will be more fully understood from the following description.

In a similar manner a difference signal representing the signal amplitude difference between the applied azimuth angular-range signal and the elevation portion of the AZ–EL angle signal is derived through transfer element T120 when the AZ–EL switch signal applied to solenoid S120 is in its high or actuating state.

The circuits thus far described in detail allow a precision strobe marking operation where separate strobes appear for the elevation and azimuth scanning period and are marked upon different displays. In addition to allowing this operation the invention also allows the marking of an azimuth center-of-scan mark for a surveillance operation as well as an elevation angular-range strobe marking on a surveillance of PPI display.

The surveillance operation is achieved through the folloing circuits. The azimuth center-of-scan mark, which may be derived through a conventional microswitch arrangement providing a signal of changing amplitude at a predetermined angular position, is applied to a differentiating circuit 140 and thence to one input contact of switch 130. The other input contact of switch 130 receives the output pulses of comparator circuit 200.

Switch 130 includes a transfer element T130 which receives the differentiated azimuth center-of-scan signal through circuit 140 when it is in its upper position and receives the comparator output pulses when in its lower position. The signal derived through transfer element T130 is then applied to search-precision switch 150 and specifically to a first input contact thereof. The second input contact of switch 150 receives amplitude comparator circuit output pulses.

When switch 150 is in its upper position, during a searching operation, it receives signals through transfer element T130 which may represent either the azimuth center-of-scan position or the elevation angular-range signal, derived through switch 130, which remains in an azimuth or unactuated position during the searching operation. The selection between the azimuth center-of-scan signal and the elevation angular-range signal is made through switch 130 which receives a strobe selection signal specifying which of the two marks is to be displayed.

When switch 150 is actuated to the precision position, transfer element T150 therein then receives signals directly from comparator circuit 200 representing the strobe time position for the elevation and azimuth angular-range center-line representing pulses, during the azimuth and elevation scanning periods, respectively.

The general operation of the invention will now be further described by considering the diagrams of Fig. 1b and 1c illustrating search and precision displays, respectively. As pointed out above, when switch 150 is unactuated a search or surveillance operation is performed where, in accordance with the operator's selection, either an azimuth center-line strobe, or an elevation angular-range strobe may be displayed. In one arrangement the strobe selection switch 130 may be in a normal state where the azimuth center-of-scan signal is received. In this position, a differentiated signal is applied through switches 130 and 150 to gating circuit 300, indicating that a strobe is to be displayed.

As will be more fully understood from the description which follows, the differentiated signals passed in this manner then actuate circuits 300, 400 and 500 which control display device 600 to produce a line-representing strobe. This strobe is indicated in Fig. 1b as an azimuth center-line strobe which may be considered to represent the center line of the azimuth antenna scanning angle during a precision operation. The display of Fig. 1b thus provides a polar coordinate view of the scanning area where the azimuth antenna is at the center or origin position of the polar display and the strobe lines represent the corresponding polar-space lines.

When the operator then actuates the selection switch 130, signals are received through comparator circuit 200 which are positioned in time corresponding to the time of occurrence of the amplitude crossover point between the AZ–EL angle signal and the elevation angular range signal derived through circuits 100 and 120. Switch 150 thus passes a pulse which indicates the time that the polar position of the rotating azimuth antenna (throughout 360° during the surveillance operation) coincides with the center line for the azimuth angular position of the elevation antenna, or the azimuth center-of-scan position for the azimuth antenna.

Thus the display of Fig. 1b provides a searching or surveillance PPI display which may be utilized to locate targets which typically may be guided for ground-controlled approach. At the same time the operator is provided accurate information as to the positions which the elevation and azimuth antennas may have during the precision operation which is to follow. Thus the operator may observe the azimuth center-of-scan strobe and note, knowing the azimuth scanning range, that the target detected during search falls within scanning range of the azimuth antenna for precision. Furthermore, as more particularly pointed out in the above-mentioned copending application by Landee, the antenna mount structure may be rotated to other scanning positions to encompass targets which are not within the azimuth scanning range.

Having determined then that the target falls within the azimuth scanning range, the operator may determine whether or not the target will also be within the elevation scanning angle. This is achieved by actuating selection switch 130 and then observing the position of the elevation angular range strobe relative to the azimuth center of scan strobe. If the target to be guided falls within a proximity of the angular range strobe which is within the beam width of the elevation antenna, then the operator is ensured that target information will appear in both the elevation and azimuth precision displays.

When precision operation begins and switch 150 is actuated to its other state the comparator output pulses then are phased in time to represent the azimuth and elevation angular range center-line positions. These pulses are referenced to the AZ–EL angle signal which also indicates the absolute position of the azimuth and elevation antennas (see Tasker et al. referenced above). A strobe line may then be produced as a modified beam intensity in time coincidence with the occurrence of the comparator output pulses. A typical resulting display is shown in Fig. 1c where the elevation and azimuth precision sectors are shown as "B" displays with range and angle as respective perpendicular coordinates.

A suitable form of amplitude comparator circuit is shown in schematic form in Fig. 2 and is designed in accordance with the basic considerations introduced in the above-mentioned copending application by Lawrence Michels entitled "Differential Amplifier." Basically the comparator circuit includes a first differential amplifier stage 210 including a diode of suitable type 5726 connected between the anodes of a twin triode type 5751. As is more fully explained in the copending application by Michels this arrangement provides a very sharp signal change at the amplitude cross-over point. In the present situation the amplitude cross-over point has been referenced to ground so that any time the difference signal, applied to comparator 200 through switch 120, passes through zero, a sharp signal change occurs at the output signal of circuit 210.

This signal change then is applied to a second differential amplifier stage 220 where it is further sharpened and is finally applied to a differentiating circuit 230 producing corresponding pulses having respective polarities determined by the sense of the output signal change.

The operation of comparator 200 is illustrated in the waveforms of Fig. 2a. As indicated in Fig. 2a, waveform A shows the AZ–EL angle signal in its relationship to an applied angular-range signal. The signal which is applied to comparator 200 then effectively is an AZ–EL signal which is offset in a negative direction in accordance with the angular-range signal. Whenever the amplitude of the AZ–EL angle signal and the applied angular-range signal are equal, the signal B produced by differential amplifier stage 220 has a corresponding sharp amplitude change. Thus at point (1) in waveform A of Fig. 2a the AZ–EL angle signal increases beyond the amplitude of the angular-range signal and the level of signal B changes sharply in the positive direction. At the same time then differentiating circuit 230 produces a positive output pulse C1.

In a similar manner then a positive or negative signal change occurs in signal B each time there is an amplitude cross-over point between the AZ–EL angle signal and the angular-range signal. And for each of these signal changes differentiating circuit 230 produces a positive or negative output pulse depending upon the sense of the change.

The pulses which occur as a result of the return signal change of the AZ–EL angle signal, between successive azimuth and elevation scanning periods, are eliminated in mixer circuit 500 which receives a blanking signal D shown in Fig. 2a. This signal is included in the other intensity control signals mentioned above. Thus the effective pulses produced by comparator circuit 230 are positive and negative signals corresponding to amplitude cross-over point between the AZ–EL angle signal and the angular-range signal.

The comparator positive and negative pulses then are applied through switch 150 to the input circuit of gating circuit 300 shown in specific schematic detail in Fig. 3. Gating circuit 300 includes first and second triode amplifiers T301 and T302 which conveniently may be obtained through a tube type 12AT7. These triodes have a common anode consisting of a first load resistor R301 in series with a second load resistor R302, the junction of the two resistors providing the gating circuit output signal E. Tube T301 is normally biased so that it is highly conducting with the result that the output level of signal E is normally low, and is effectively clamped at the low level, so that positive input signals which are received by tube T301 have no effect.

When a negative signal is received, however, tube T301 is actuated to a reduced conduction or cut-off state which results in a signal amplitude increase at the output lead. The output signal E remains at a high level as long as the negative input pulse maintains tube T301 in the reduced conducting state.

Tube T302 is then utilized as a gating amplifier and receives trigger signals which are to be passed through this tube whenever tube T301 ceases to operate as a clamping device. The proper bias for this operation is provided by a biasing circuit 305. Thus when the signal amplitude of the output lead raises during the receipt of a differentiated signal C, trigger signals are amplified and result in negative signal changes in the output signal E.

The above operation is more clearly illustrated in the waveforms of Fig. 3a where the waveform C corresponds to an expanded negative waveform C, as is received from comparator circuit 200 or differentiating circuit 140. During the presence of signal C then the output signal of gating circuit 300 assumes a high level except during the coincidence therewith of positive trigger signals which are amplified and inverted through tube T302.

In this manner then the trigger signals are effectively gated through circuit 300 whenever a differentiated signal is received through switch 150. These gated signals then are applied to inhibited multivibrator 400 shown in specific schematic detail in Fig. 4. As indicated in Fig. 4 the gated trigger signals are applied through an input capacitor C401 and a charging capacitor C402 to the grid of a first tube T401, in circuit 400. The output signal derived from the anode of tube T401 is applied to the grid input circuit of a second tube T402. Tubes T401 and T402 may conveniently be provided by tube type 12AT7.

These two tubes have a common cathode load resistor R403 and constitute a conventional single stable state multivibrator stage. Tube T402 has a load impedance consisting of a first load resistor R401 connected in series with a second load resistor R402, the junction therebetween providing the multivibrator output signal. When gated trigger signals E (shown in waveforms of Fig. 4a) are applied to tube T401, multivibrator 400 is effectively triggered upon receipt of the first signal to a state where tube T401 is in a low conducting condition and tube T402 is in a high conducting condition with the result that the output signal F derived from the load of tube T402 decreases in amplitude.

This decreased amplitude signal may be considered to be the unstable state signal referred to above and continues at the depressed level for a period which is determined by the time constant provided by the charging circuit including capacitor C402 and a series connected impedance comprising a potentiometer P402 connected in series with a resistor R405. As indicated in Fig. 4a, this time constant is selected to be in the order of the period between successive triggering signals so that one sweep interval may be modified.

The signal G appearing at the grid of tube T401 is shown as a matter of interest to show that it is selected to discharge above the cut-off bias tube T401 in the desired sweep interval.

Multivibrator 400 is then disabled from being actuated from immediately following trigger signals due to the action of inhibiting circuit 410, including diode D411 having a cathode load resistor R411 which receives a suitable biasing potential through resistor R412. The anode of diode D411 receives a suitable biasing potential through a resistor R413.

When signal H, appearing at the anode of tube T401, rises the signal I at the grid of tube T402 rises correspondingly to a more positive level since capacitor C405 which passes signal H thereto is charged very rapidly through the low impedance grid to cathode path of tube T402. However, after capacitor C405 is charged in this manner, it effectively provides a negative bias supply for a grid of tube T402 so that when signal H returns to its low level, tube T402 is biased far below cut-off.

This cut-off biasing signal then is very slowly discharged through the resistor R413, which has a rather large value (1 meg.), and therefore tube T402 is cut off for a relatively large number of trigger signal intervals so that multivibrator 400 will not respond to gated trigger signals during this period. In other words, signal F is thereby effectively clamped at a high level during this period.

As a result multivibrator 400 is readily actuated in response to the first trigger signal gated through circuit 300 and produces an unstable state output signal for a period which may be adjusted to be commensurate with a single sweep interval. And further multivibrator 400 includes inhibiting circuit 410 preventing it from actuation by subsequent trigger signals gated through circuit 300. In this manner then the invention ensures that at least one trigger signal is gated for each comparator output signal of a predetermined sense, which may in a particular application be a negative signal change, and that only one gated trigger signal is effective to actuate multivibrator 400 to an unstable state for substantially a sweep period.

The unstable state signal of multivibrator 400 then is combined with other intensity control signals in mixer 500 shown in specific schematic detail in Fig. 5. As shown in Fig. 5 the strobe or unstable state signal F is applied to a first tube T501 therein and a second tube T502 receives the other intensity control signals. The anodes of tubes T501 and T502 are coupled together through a load resistor R503. As a result the output signal derived from the anode of tube T502 is a function of both the applied signals F and the other intensity control signals. In its general operation circuit 500 provides an output signal having a normal level for controlling a corresponding beam intensity which is specified by the other intensity control signals applied to tube T502. Where blanking signals are included in the signals applied to tube T502 these levels are selected so that any signals applied to tube T501 would have no effect in causing a beam trace on display device 600.

However, when a normal intensity beam is specified by the signals applied to T502 and in coincidence therewith a strobe or unstable state signal F is applied to tube T501, the resulting output signal amplitude is modified so as to represent one of the marking lines discussed above. In a typical application this modification is made by increasing the amplitude of the beam intensity. In the specific arrangement shown in Fig. 5 this increase in amplitude is achieved through the action of the negative going signal F during the sweep period where the beam is to be intensified, which drives the anode of tube T501 more positive with the result that the combined signal appearing at the output lead of mixer 500 is increased in amplitude by a predetermined amount corresponding to the intensification desired. This effect, however, is not present where the other intensity control signals specify a complete blanking of display device 600.

From the foregoing description it is apparent that the present invention provides an improved marking circuit which may be selectively operable for either a search or precision operation where either center-of-scan indicating signals are desired or angular range marking signals are desired.

It should now be apparent that circuits 300 and 400 have the particular important feature whereby an accurate strobe may be obtained having a time length corresponding to the sweep period between successive trigger signals and where insurance is provided that strobes will not be produced at unwanted intervals.

It should be apparent, for example, that the gating circuit shown is selected to respond to pulses of a predetermined polarity so that the strobes provided may represent amplitude cross-over points of a predetermined sense.

Furthermore, it should now be apparent that these circuits ensure that at least one trigger signal passes and that the beam is intensified for only one sweep interval.

It has been shown further that the invention allows a selection in operation where the marking circuit provided may be controlled to produce either an angular-range indicating signal or a center-of-scan indicating signal without the necessity of a duplication of circuits therefor.

Furthermore, a simple circuit arrangement is provided which is versatile in allowing a selection for either search or precision strobe marking at an operator's option. It may be noted further in this connection that by including differentiating circuit 140 in embodiments of the invention, assurance is made that the operator's selection at switch 130 does not appear to be a signal change such as may be available through a microswitch arrangement. Thus in this manner no ambiguous signals are applied to gating circuit 300 when the operator actuates switch 130.

What is claimed is:

1. In a system wherein a rotatable scanning device may be utilized alternately for precision scanning about a predetermined center line or search scanning by rotation; the system including means for displaying signals detected during search scanning, the display being achieved by sweeping a beam in a radial direction from an origin point where each sweep period is initiated in response to a received trigger signal and corresponds to the range along the radial sweep; a strobe marking circuit for producing a signal which may be displayed during the rotating operation of the scanning device to indicate the position of the predetermined center line, said strobe marking circuit comprising: first means for presenting a center-of-scan signal occurring in time coincidence with the passing of said rotatable scanning device through the predetermined center line; second means responsive to the center-of-scan signal for producing a gating control signal having a predetermined width; third means responsive to said gating control signal and to received trigger signals for producing an output signal corresponding to the occurrence of a trigger signal; and fourth means responsive to the output signal for producing an intensity control signal having an intensity modifying level after the occurrence of the first change in said output signal, the duration of the intensity modifying level of said intensity control signal being selected to be in the order of one sweep period.

2. In an arrangement where a plan-position-indicator display is to include a strobe line indicating the center line of a precision scanning angle, the arrangement including a display device which is actuated at the beginning of respective sweep periods, marked by trigger signals, to move an indicating beam from an origin point in a polar vector direction, the rate of movement corresponding to the range of target information to be displayed; a circuit for intensifying the display in one sweep direction corresponding to the position of the center line, said circuit comprising: a gating circuit actuable to assume a nongating state prior to the positioning of said sweep direction along the center line, and to assume a gating state for at least one sweep period as the sweep passes through the center line position, said gating circuit receiving the trigger signals and passing at least one trigger signal therethrough to indicate the position of said center line; and an inhibiting multivibrator responsive to the first trigger signal passed through said gating circuit for producing an intensifying signal having a high level during the sweep period immediately following the receipt of said first trigger signal and having a lower level for a relatively large number of sweep periods thereafter.

3. The circuit defined in claim 2 wherein there is further included a mixing circuit for receiving said intensifying signal and other intensity control signals to produce a composite intensity-control signal, said composite signal having an amplitude selected to inhibit any display in the device to be controlled when neither the received intensifying signal nor the other intensity control signals have a high level; said composite signal having a first level of intensity when said other intensity control signals assume a high level and said intensifying signal has a low level, and having a second level for controlling a modification in the intensity of the display when both said other intensity control signals and said intensifying signal have a high level.

4. In a system where the azimuth position of an elevation scanning device is to be displayed on an indicator device, the azimuth position of an azimuth scanning device being represented by an angle signal having a variable amplitude corresponding to the instantaneous position of the azimuth device, a circuit for producing a marking signal indicating the time that the azimuth scanning device passes through the azimuth position of the elevation scanning device, said circuit comprising: first means for presenting a first signal having a level corresponding to the azimuth position of the elevation scanning device; second means for comparing the first signal and the angle signal to produce a second signal having a changing level at the point of amplitude coincidence between the first signal and the angle signal; third means responsive to changes of a predetermined sense in said second signals for producing gating signals; fourth means responsive to said gating signals and received trigger signals for passing at least one trigger signal for each second signal change of said predetermined sense; and fifth means responsive to the passed trigger signal for producing the marking signal.

5. In a radar system wherein scanning is to be performed by first and second separate devices in respective planes, a circuit arrangement for indicating the intersection of the plane of scanning of one of the devices with the plane of scanning of the other device, said arrangement comprising: first means for producing a variable position signal indicating the rotatable position of the first device; second means for producing a fixed position signal indicating the angular position of the plane of scanning of the second device in the plane of the first device; third means for comparing the signals of said first and second means to produce a first output signal having a point of change indicating the amplitude coincidence therebetween; and fourth means responsive to said first output signal for producing a second output signal having an intensifying level for each change in said first output signal in a predetermined sense, said intensifying level thereby occurring it a time corresponding to the signal change resulting when the rotatable position of said first device passes through the plane position of said second device.

6. In an arrangement where a display is selectively operable to include either a center-line marking strobe, specifying the center of a precision scanning angle, existing in a first plane, or the position of a second scanning plane referenced to said first plane; a selectively operable marking circuit comprising: first means for producing a center of scan signal having a changing amplitude at a point corresponding to the center of said precision scanning angle in said fixed plane; second means for producing a second level changing signal having a change at a point indicating when the display angle coincides with the angular position of said second plane; selectively operable third means for selecting one of the signals of said first and second means; and fourth means for translating the selected one of said first and second level changing signals into a corresponding short duration pulse suitable for controlling the generation of an intensity control signal for said display.

7. In a system wherein scanning is to be performed by first and second separate devices in respective intersecting planes, a circuit arrangement selectively operable either to indicate the intersection of the second plane with the first plane or a scanning center line for fractional scanning in said first plane, said arrangement comprising: first means for producing a center-of-scan signal marking the center line for the scanning of said first device; second means for producing a variable position signal indicating the rotatable position of the first device and for producing a fixed position signal indicating the angular position of the plane of scanning of the second device referenced to the plane of the first device; and third means responsive to said variable position signal and selectively responsive to said fixed position signal or to said center-of-scan signal for producing an intensifying signal having a high level for a predetermined period following the time an equality occurs between said variable position signal and the selected one of said fixed position and center-of-scan signals.

8. In a ground controlled approach system incorporating azimuth and elevation antenna systems to scan respectively an azimuth and elevation plane means for producing a first signal having an amplitude proportional to the scanning position of one of the antenna systems, and indicator means having a radial sweep for displaying radar echoes received by said one antenna system, the combination comprising: means for producing a second signal having an amplitude proportional to the angular position of the line of intersection of said scanning planes from a fixed reference line in the scanning plane of said one antenna; and means for additionally impressing a strobe gate signal on said indicator means when said first signal becomes equal to said second signal.

9. In a ground controlled approach system incorporating first and second antennas mounted to move respectively in first and second intersecting planes and an indicator responsive to the output of said first antenna to produce a display of the position of detected aircraft, a device for impressing an additional video signal on said indicator to cause it to produce an indication of the instantaneous angular position of said second plane on the same display, said device comprising: means for producing a first signal having a magnitude proportional to the instantaneous angular position of said first antenna in said first plane; means for producing a second signal having a magnitude proportional to the angular position of said second plane with respect to a fixed reference line in said first plane; and means responsive to said first and second signals for producing a video signal at a time when said first and second signals become equal in magnitude.

10. In a ground-controlled approach system incorporating azimuth and elevation antennas mounted to scan in approximately intersecting azimuth and elevation planes, respectively, an indicator responsive to the output of said azimuth antenna to produce a display of the position of the detected aircraft, a device for impressing an additional video signal on said indicator to cause it to produce an indication of the azimuthal position of said elevation antenna elevation scanning plane on the same display, said device comprising: means for producing a signal having a magnitude proportional to the instantaneous azimuthal position of said azimuth antenna; means for producing a second signal having a magnitude proportional to the azimuthal position of said elevation antenna; and means responsive to said first and second signals for producing said video signals when said first and second signals become equal in magnitude.

11. In a ground-controlled approach system incorporating azimuth and elevation antennas mounted to scan respectively in approximately azimuth and elevation planes, and an indicator responsive to the output of said elevation antenna to produce a display of the position of detected aircraft, a device for impressing an additional video signal on said indicator to cause it to produce an indication of the instantaneous angular elevation position of said azimuth antenna on the same display, said device comprising: means for producing a first signal having a magnitude proportional to the instantaneous angular position of said elevation antenna in said elevation plane; means for producing a second signal having a magnitude proportional to the angular position of said azimuth antenna in elevation; and means responsive to said first and second signals for producing said video signal when said first and second signals become equal in magnitude.

References Cited in the file of this patent

UNITED STATES PATENTS

| | | |
|---|---|---|
| 2,422,697 | Meacham | June 24, 1947 |
| 2,483,644 | Kelsey et al. | Oct. 4, 1949 |